L

(12) United States Patent
Wakizaka et al.

(10) Patent No.: US 8,895,184 B2
(45) Date of Patent: Nov. 25, 2014

(54) POROUS FILM, SECONDARY BATTERY ELECTRODES, AND LITHIUM ION SECONDARY BATTERY

(75) Inventors: Yasuhiro Wakizaka, Yokoham (JP); Mayumi Fukumine, Kawasaki (JP)

(73) Assignee: Zeon Corporation, Tokyo (JP)

( * ) Notice: Subject to any disclaimer, the term of this patent is extended or adjusted under 35 U.S.C. 154(b) by 173 days.

(21) Appl. No.: 13/061,379

(22) PCT Filed: Aug. 27, 2009

(86) PCT No.: PCT/JP2009/064955
§ 371 (c)(1),
(2), (4) Date: Feb. 28, 2011

(87) PCT Pub. No.: WO2010/024328
PCT Pub. Date: Mar. 4, 2010

(65) Prior Publication Data
US 2011/0159362 A1    Jun. 30, 2011

(30) Foreign Application Priority Data
Aug. 29, 2008  (JP) ................................. 2008-221019

(51) Int. Cl.
| H01M 4/02 | (2006.01) |
| H01G 9/04 | (2006.01) |
| H01G 9/02 | (2006.01) |
| H01G 11/38 | (2013.01) |
| H01G 11/46 | (2013.01) |
| H01M 2/16 | (2006.01) |
| H01M 4/13 | (2010.01) |
| H01M 10/052 | (2010.01) |

(52) U.S. Cl.
CPC ................ H01G 9/058 (2013.01); H01G 9/02 (2013.01); H01G 11/38 (2013.01); H01G 11/46 (2013.01); H01M 2/166 (2013.01); H01M 4/13 (2013.01); H01M 10/052 (2013.01); Y02E 60/122 (2013.01); Y02E 60/13 (2013.01)
USPC .......................... 429/209; 429/232; 429/218.1

(58) Field of Classification Search
USPC ....................... 429/209, 232, 218.1
See application file for complete search history.

(56) References Cited

U.S. PATENT DOCUMENTS

| 6,527,955 | B1 | 3/2003 | Sun |
| 2003/0152828 | A1 | 8/2003 | Sun |
| 2003/0157408 | A1 | 8/2003 | Sun |
| 2006/0046149 | A1 | 3/2006 | Yong et al. |
| 2006/0105245 | A1 | 5/2006 | Ikuta et al. |
| 2007/0117025 | A1 | 5/2007 | Ikuta et al. |
| 2009/0061313 | A1 | 3/2009 | Tadano |
| 2009/0067119 | A1* | 3/2009 | Katayama et al. ............ 361/523 |
| 2009/0291360 | A1* | 11/2009 | Kim et al. ..................... 429/145 |

FOREIGN PATENT DOCUMENTS

| CN | 101002347 A | 7/2007 |
| JP | 10-154500 A | 6/1998 |
| JP | 10-241656 A | 9/1998 |
| JP | 2000-21386 A | 1/2000 |
| JP | 3371301 B2 | 1/2003 |
| JP | 2004-2658 A | 1/2004 |
| JP | 2008-16312 A | 1/2008 |
| JP | 2009-54455 A | 3/2009 |
| WO | WO 98/22988 A1 | 5/1998 |
| WO | WO 2005/124899 A1 | 12/2005 |
| WO | WO 2008/004430 A1 | 1/2008 |

OTHER PUBLICATIONS

International Preliminary Report on Patentability for Application No. PCT/JP2009/064955, dated Apr. 12, 2011.
International Search Report PCT/JP2009/064955 issued Nov. 2, 2009.

* cited by examiner

*Primary Examiner* — Jane Rhee
(74) *Attorney, Agent, or Firm* — Birch, Stewart, Kolasch & Birch, LLP

(57) ABSTRACT

In regards with the porous film provided on the surface of the electrode used for the secondary battery or so, the present invention provides the porous film which can contribute to reduce the adhered material to the roll during the roll winding of the electrode. The secondary battery electrode formed by adhering; the porous film comprising the inorganic filler and the binder, and styrene and the polymer having the glass transition temperature of 15° C. or less as said binder, the porous film slurry comprising the inorganic filler, the polymer having the glass transition temperature of 15° C. or less and the solvent, and the electrode composite layer comprising the binder and the electrode active material, to the current collector, and said porous film is provided on the surface of the electrode composite layer.

10 Claims, No Drawings

POROUS FILM, SECONDARY BATTERY ELECTRODES, AND LITHIUM ION SECONDARY BATTERY

TECHNICAL FIELD

The present invention relates to a porous film, and further specifically, the present invention relates to the porous film which is formed on the electrode surface of a lithium ion secondary battery or an electric double layer capacitor, and contributes to improve film uniformity, flexibility and cycle characteristics. Also, the present invention relates to a secondary battery electrode comprising said porous film, and the lithium ion secondary battery comprising thereof.

BACKGROUND ART

Among the batteries which are in a practical use, a lithium ion secondary battery shows the highest energy density, and has been widely used for the compact electronics. Also, in addition to the purpose of making compact, it is also hoped to be used for automobiles as well. Under such situation, the lithium ion secondary battery are demanded to have a longer lifetime, and further improved safety property.

The lithium ion secondary battery comprises; positive electrodes and negative electrodes including the electrode composite layer generally supported between a current collector, a separator, and nonaqueous electrolyte solution. The electrode composite layer includes electrode active materials having the average particle diameter of 5 to 50 µm or so and a binder. The positive and negative electrodes are produced by forming the electrode composite layer by coating composite slurry including the electrode active material powder onto the current collector. Also, as the separator for separating the positive electrode and the negative electrode, an extremely thin resin film having the thickness of 10 to 50 µm or so is used.

Usually, the lithium ion secondary battery is produced by going through the step of stacking the electrodes and the separators, and the cutting step of cutting into a predetermined electrode shape or so. However, while going through this series of production steps, the electrode active materials falls off from the electrode composite layer, and the portion of the fallen electrode active material may be included in the battery as a contaminant.

Such contaminant has the particle diameter of 5 to 50 µm or so. Since said particle diameter is about the same as the thickness of the separator, it can penetrate through the separator in the assembled battery, thereby may cause the short circuit. Also, when the battery is working, it involved the heat generation. As a result, the separator formed by the stretchable polyethylene resin or so is also heated. The separator formed by the stretchable polyethylene resin generally easily shrink even at the temperature below 150° C., hence it easily causes short circuit of the battery. Also, when the battery is penetrated by a projection having the sharp shape such as nails or so (for example, during the nail penetration test), the short circuit takes place immediately, and generates the reaction heat thus the short circuit area enlarges.

Therefore, in order to solve such problems, it is proposed to provide the porous film as the protective film on the electrode surface. By providing the porous film, the fall off of the active material during the formation of the battery, and the short circuit while the battery is working are prevented. Furthermore, since it is a porous film, the electrolyte solution permeate into the protective film hence it does not interfere the battery reaction.

For example, the patent document 1 discloses a porous film formed by using polyvinylidene fluoride as the binder and the fine particle slurry including the fine particle such as alumina and silica or so. The patent document 2 discloses a porous film formed by using a heat crosslinking resin such as polyacrylonitrile or so as the binder. Also, the patent document 3 discloses a porous film formed by using polystyrene, polyethylene, or poly acrylic acid or so.

However, when the polymer described in the above patent documents are used as the binder, during the step of winding the electrode coated with the porous film by the winding roll, the washing step of the roll is needed since the porous film adheres to the winding roll. Also, the ability as the protective film tends to deteriorate since the porous film detaches while winding.

PRIOR ART DOCUMENT

Patent document 1: US Patent Publication No. 2006/105245
Patent document 2: US Patent Publication No. 2008/070107
Patent document 3: JP-A-2000-149906

SUMMARY OF THE INVENTION

Technical Problems to be Solved by the Invention

The present invention is achieved in response to the above described situation, and its aim, in regards with as the porous film provided on the surface of the electrode used for the secondary battery or so, is to provide the porous film capable to contribute to reduce the attached materials to the roll when winding.

Means for Solving the Technical Problems

As a result of a keen examination to solve above described objects, the present inventor has found that by including styrene resin and the polymer having the glass transition temperature of 15° C. or less as the binder, it is possible to obtain the porous film capable to effectively suppress the powder falloff during the winding.

The present invention which solves the above described objects, includes the followings as the summary.

(1) A porous film comprising an inorganic filler, and a binder; wherein the porous film comprises a styrene resin and a polymer having a glass transition temperature of 15° C. or less as said binder.

(2) The porous film as set forth in (1), wherein a content of the styrene resin in said binder is 70 wt % or less.

(3) The porous film as set forth in (1) or (2), wherein a content ratio of the binder in said porous film is 0.1 to 5 parts by weight with respect to 100 parts by weight of said inorganic filler.

(4) A slurry for a porous film comprising an inorganic filler, a styrene resin, a polymer having a glass transition temperature of 15° C. or less and a solvent.

(5) A method for producing a porous film comprising: coating the slurry for a porous membrane as set forth in (4) on a substrate, and then drying the same.

(6) An electrode for a secondary battery wherein an electrode composite layer comprising a binder for an electrode and an electrode active) material is adhered to a current collector, and the porous film as set forth in (1) is provided on the surface of said electrode composite layer.

(7) A lithium ion secondary battery comprising a positive electrode, a negative electrode and an electrolyte solution wherein at least one of the positive electrode or the negative electrode is the secondary battery electrode as set forth in (6).

Effects of the Invention

According to the present invention, the porous film which contributes to suppress the powder fall off during the roll winding is provided. Said porous film is formed on the surface of the secondary battery electrode and function as the protective film of the electrodes, further it comprises high inorganic filler holding characteristic at the upper layer portion of the porous film thus contributes to prevent from adhering to the roll during the roll winding.

The present invention will be described in detail in the following.

The porous film of the present invention comprises an inorganic filler and a binder wherein said binder comprises styrene resin and a polymer having a glass transition temperature of 15° C. or less.

(The Inorganic Filler)

The inorganic filler is demanded to be electrochemically stable even when the secondary battery or so are under use. Also, the inorganic filler is preferably a material suitable for preparing the slurry by mixing with said styrene resin.

Therefore, BET specific surface area of the inorganic filler is preferably specifically 0.9 $m^2/g$ or more, and 1.5 $m^2/g$ or more. Particularly, from the point to surpress the coagulation of the inorganic filler and to optimize the slurry fluidity, it is preferable that the BET specific surface area is not too large, and specifically, it is preferably 150 $m^2/g$ or less. Also the average particle diameter of the inorganic filler (D50 average particle diameter of the volume average) is preferably 0.1 to 5 µm, and 0.2 to 2 µm. If the ratio of the small particle diameter is too large, the specific surface area of the filler becomes too large, hence it tends to easily coagulate. If the particle diameter becomes large, the porous film becomes too thick for making a uniform porous film, thus it may reduce the capacity of the battery.

As for the inorganic filler oxidized particles such as aluminum oxide, silicon oxide, magnesium oxide, titanium oxide, $BaTiO_3$, ZrO, and alumina-silica composite oxide or so; nitride particles such as aluminum nitride, boron nitiride or so; covalent bond crystal particles such as silicon, diamond or so; poorly soluble ionic crystal particle such as barium sulfate, calcium fluoride, barium fluoride or so; clay fine particles such as talc, montmorillonite or so may be used. These particles may be subject to an element substitution, a surface treatment, and a solid solution treatment, also it may be made of single particle or a composite of two types or more. Among these, the oxide particle is preferable from the point of the stability and the electric potential stability in the electrolyte solution.

(The Binder)

The porous film of the present invention comprises styrene resin and the polymer having the glass transition temperature of 15° C. or less as the binder. In the following, the binder used for the porous film may be described as "the binder for a porous film", and the binder used for the electrode composite which is described in the following may be described as "the binder for an electrode composite binder". By comprising the styrene resin in the porous film, the slurry for a porous film described hereinafter is prepared, followed by coating thereof and drying, the styrene resin starts to migrate hence the styrene resin can easily localize in the porous film surface layer. The present invention uses the above mentioned, thereby allows suppressing the powder fall off which is caused by the porous film adhering to the roll during the roll winding.

The styrene resin used in the present invention includes 60 wt % to 100 wt %, preferably 70 wt % to 100 wt %, and further preferably 80 wt % to 100 wt % of a monomer unit of the styrene and the derivatives thereof (hereinafter, it may be referred to as "styrene unit"); and the styrene resin used in the present invention is a polymer having the glass transition temperature of 20° C. or higher. By having the styrene unit in the styrene resin within the above mentioned range, the suppression effect of the powder fall off during the roll winding is improved.

As for the styrene derivatives, α-methyl styrene, p-methyl styrene, and vinyl toluene or so may be mentioned.

The styrene resin may be a homopolymer of styrene, and it may be a homopolymer of the styrene derivative, furthermore it may be a copolymer of two or more selected from the group comprising styrene and the derivative thereof. Also, other monomers which can copolymerize may be copolymerized as well, as far as it does not compromise the effect of the present invention. As for such copolymer component, diene type monomer, olefin type monomer, acrylate type monomer, fluoride type monomer, urethane type monomer, silicone type monomer, polyamide type monomer or polyimide type monomer, and ester type monomer or so may be mentioned.

Among these, diene type monomer, fluoride type monomer, and acrylate type monomer, are preferable, since the electrochemical stability and high cycle characteristics can be obtained.

As for diene type monomer, the conjugated diene such as butadiene, isoprene, or 1,3-pentadiene or so may be mentioned.

As for acrylic type monomer, the derivative of acrylic acid, methacrylic acid or crotonic acid may be mentioned.

As for fluoride type monomer, the monomer which comprises fluorine such as vinylidene fluoride, and tetrafluoro ethylene or so may be mentioned.

Also, in the present invention, various structures such as a random structure, a block structure, and a branched structure or so may be mentioned as the structure of the styrene resin. As for the block copolymer comprising the block structure; a diblock type block copolymer such as styrene-butadiene block copolymer, styrene-isobutylene block copolymer, and styrene-isoprene block copolymer or so; a triblock type block copolymer such as styrene-butadiene-styrene block copolymer, styrene-isoprene-styrene block copolymer, styrene-butadiene-isoprene block copolymer, and styrene-butadiene-styrene block copolymer or so; and multiblock type styrene containing block copolymer such as styrene-butadiene-styrene-butadiene block copolymer, styrene-isoprene-styrene-isoprene block copolymer, styrene-butadiene-isoprene-styrene block copolymer, styrene-butadiene-styrene-isoprene block copolymer and styrene-ethylene-propylene-styrene block copolymer or so may be mentioned. In case of copolymerizing the diene type monomer, it is preferable to hydrogenate the unreacted double bond after the copolymerization in order to obtain the electrochemical stability and the high cycle characteristics.

In the present invention, the weight average molecular weight obtained by the gel permeation chromatography (GPC) of the styrene resin is preferably within the rage of 10,000 to 600,000, and further preferably 10,000 to 400,000. By having the weight average molecular weight of the styrene resin within the above mentioned range, the leveling property of the slurry for a porous film, which will be described hereinafter, is improved and thus can obtain the porous film having high surface smoothness.

According to the present invention, the glass transition temperature obtained by the differential scanning calorimetry (DSC) analysis of the styrene resin is 20° C. or higher, and preferably 20° C. to 120° C., further preferably within the range of 40° C. to 100° C. By having the glass transition temperature of the styrene resin within the above mentioned range, the suppression effect of the powder fall off during the roll winding is improved in the wide temperature range.

The manufacturing method of the styrene resin is not particularly limited; however any of a solution polymerization method, a suspension polymerization method, a bulk polymerization method, or an emulsion polymerization method or so may be used. As for the polymerization method, any method of an ion polymerization, a radical polymerization, or a living radical polymerization or so may be used.

According to the present invention, the content of the styrene resin in the binder of the porous film is preferably 5 to 70 wt %, and further preferably 20 to 50 wt %. By having the content of the styrene resin in the porous film binder within the above mentioned range, it does not adhere during the roll winding, and further the porous film having a high flexibility can be obtained.

In the present invention, besides the above mentioned styrene resin as the binder for a porous film, the polymer having the glass transition temperature of 15° C. or less is an essential component.

By comprising the polymer having the glass transition temperature of 15° C. or less, the flexibility of the porous film is improved, and the crack of the porous film can be suppressed. Also, if the glass transition temperature of the polymer, which is included other than the styrene resin as the binder, exceeds 15° C., the flexibility of the porous film is lowered, and the porous film may crack during the roll winding.

As the polymer having the glass transition temperature of 15° C. or less, various soft polymers may be used.

As the soft polymer, an acrylic type soft polymer which is a homopolymer of the acrylic acid derivatives or methacrylic acid derivative, or the copolymer of the monomer polymerizable therewith, such as polybutyl acrylate, polybutylmethacrylate, polyhydroxyethylmethacrylate, polyacrylamide, polyacrylonitrile, butylacrylate/styrene copolymer, butyl acrylate/acrylonitrile copolymer, and butylacrylate/acrylonitrile/grycidylmethacrylate copolymer or so;

isobutylene type soft polymer such as polyisobutylene, isobutylene/isoprene rubber, isobutylene/styrene copolymer or so;

diene type soft polymer such as polybutadiene, polyisoprene, butadiene/styrene random copolymer, isoprene/styrene random copolymer, acrylonitrile/butadiene copolymer, acrylonitrile/butadiene/styrene copolymer, butadiene/styrene block copolymer, styrene/butadiene/styrene block copolymer, isoprene/styrene block copolymer, styrene/isoprene/styrene block copolymer or so;

silicon comprised soft polymer such as dimethyl polysiloxane, diphenyl polysiloxane, dihydroxy polysiloxane or so;

olefin type soft polymer such as liquid polyethylene, polypropylene, poly-1-butene, ethylene/α-olefin copolymer, propylene/α-olefin copolymer, ethylene/propylene/diene copolymer (EPDM), ethylene/propylene/styrene copolymer or so;

vinyl type soft polymer such as poly vinyl alcohol, poly vinyl acetate, poly vinyl stearic acid, vinyl acetate/styrene copolymer or so;

epoxy type soft polymer such as polyethylene oxide, polypropylene oxide, epichlorohydrin rubber or so;

fluoride containing soft polymer such as vinylidene fluoride rubber, tetrafluoride ethylene-propylene rubber or so; and other soft polymers such as natural rubber, polypeptide, polyethylene thermoplastic elastomer, vinylchloride thermoplastic elastomer, polyamide thermoplastic elastomer or so may be mentioned.

These soft polymers may comprise crosslinked structures, or it may be introduced with functional groups by modification.

According to the present invention, regardless of the type of the polymer, said polymers show the effect of the present invention as long as the glass transition temperature is 15° C. or less; however among these, the polymer having a good compatibility with the styrene resin in the styrene resin soluble solution is preferable from the point of suppressing the two layer separation of the slurry for a porous film while standing still. As the means to improve the compatibility with the styrene resin, polystyrene copolymer and polystyrene graft polymer or so may be used as the compatibility accelerator. Also, the separation of the polymer in the solution can be suppressed by allowing having the suitable viscosity under the slurry status. The compatibility status between the styrene resin and the polymer having the glass transition temperature of 15° C. or less may be confirmed by solving the styrene resin and the polymer having the glass transition temperature of 15° C. or less in the solution and stand still for a week or so, then carrying out the component analysis of the upper layer and the bottom layer by using the infrared spectrometry.

Note that, the glass transition temperature of the polymer can be controlled by changing the type of the monomer used for polymerizing the polymer or by changing the copolymer composition. Also, the weight average molecular weight of the polymer having the glass transition temperature of 15° C. or less is preferably 1,000 to 100,000. By having the weight average molecular weight within the range of above mentioned, the porous film exhibits high binding property, and the porous film does not tear off during the roll winding or the electrode transportation, further the porous film can have high flexibility.

Among the above mentioned polymer, acrylic type soft polymer, isobutylene type soft polymer, and diene type soft polymer are preferable among the abovementioned soft polymers. Particularly, acrylic type polymer is preferable from the point that it is stable in the oxidation-reduction reaction and that a long life can be obtained easily.

Furthermore, in case the surface of the inorganic filler has a hydrophilic property, it is preferable that the polymer has a hydrophilic functional group in order to accomplish high dispersity stability and the binding strength.

As for the hydrophilic functional group, carboxylic acid group, hydroxyl group, and sulphonic acid group may be mentioned. The hydrophilic functional group can be introduced by copolymerizing with the monomer containing the hydrophilic functional group, or by polymerizing using the polymerization initiator containing the hydrophilic functional group, while producing the polymer mentioned in the above.

As the monomer comprising the carboxylic acid group, monocarboxylic acid and the derivative thereof, dicarboxylic acid, acid anhydride, and the derivatives thereof may be mentioned.

As monocarboxylic acid, acrylic acid, methacrylic acid, crotonic acid or so may be mentioned. As the derivative of monocarboxylic acid, 2-ethylacrylic acid, 2-ethylacrylic acid, isocrotonic acid, α-acetoxy acrylic acid, β-trans-allyloxy acrylic acid, α-chloro-β-E-methoxy acrylic acid, β-diamino acrylic acid or so may be mentioned.

As dicarboxylic acid, maleic acid, fumaric acid, itaconic acid or so may be mentioned. As acid unhydride of the dicarboxylic acid, maleic unhydride, acrylic acid unhydride, methyl acrylic acid unhydride, dimethyl acrylic acid unhydride, or so may be mentioned.

As the dicarboxylic acid derivative, methylmaleic acid, dimethyl maleic acid, phenylmaleic acid, chloromaleic acid, dichloromaleic acid, fluoromaleic acid; maleate such as methyl allyl maleate, diphenyl maleate, nonyl maleate, decyl maleate, dodecyl maleate, octadecyl maleate, and fuluoroalkyl maleate may be mentioned.

As the monomer comprising the hydroxyl group, unsaturated ethylene alcohol such as (meth)allyl alcohol, 3-butene-1-ol and 5-hexene-1-ol; ester alcanol of unsatureated ethylene carboxylic acid such as 2-hydroxyethyl-acrylate, 2-hydroxypropyl-acrylate, 2-hydroxyethyl-methacrylate, 2-hydroxypropyl-methacrylate, di-2-hydroxyethyl-maleic acid, di-4-hydroxybutyl-maleic acid, and di-2-hydroxypropyl-itaconic acid; ester of polyalkyleneglycol and (meth)acrylate expressed by general formula of $CH_2\!=\!CR^1\!-\!COO\!-\!(C_nH_{2n}O)_m\!-\!H$ (m is integers of 2 to 9, n is integers of 2 to 4, and $R^1$ indicates hydrogen or methyl group); mono (meth)acrylic acid of dihydroxyester of the dicarboxylic acid such as 2-hydroxyethyl-2'-(meth)acryloyl oxyphthalate, 2-hydroxyethyl-2'-(meth)acryloyloxy succinate; vinyl ether such as 2-hydroxyehtyl vinyl ether, 2-hydroxypropyl vinyl ether or so; mono(meth)allyl ether of alkylene glycol such as (meth)allyl-2-hydroxy ethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol(meth)monoallyl ether such as diethylene glycol mono(meth)allyl ether, diproplyene glycol mono(meth)allyl ether; halogen and mono(meth)allyl ether of the hydroxyl substitute of the polyalkyleneglycol such as glycerin mono(meth)allyl ether, (meth)allyl-2-chloro-3-hydroxypropyl ether, and (meth)allyl-2-hydroxy-3-chloropropyl ether or so; polyvalent phenol mono(meth)allyl ether of the polyvalent phenol and the halogen sabsitute thereof such as eugenol and isoeugenol; (meth)allyl thioether of alkylene glycol such as (meth)allyl-2-hydroxyethyl thioether and (meth)allyl-2-hydroxypropyl thioether; or so may be mentioned.

As the monomer comprising the sulfonic group; vinyl sulfonic acid, methylvinyl sulfonic acid, (meth)allyl sulfonic acid, styrene sulfonic acid, (meth)acrylic acid-2-ethylsulfonate, 2-acrylamide-2-methylpropane sulfonic acid, 3-allyloxy-2-hydroxypropane sulfonic acid or so may be mentioned.

The content of the hydrophilic functional group in the polymer is within the range of preferably 0.3 wt % to 40 wt % and further preferably 3 wt % to 20 wt %, with respect to 100 wt % of the entire content of the monomer as the amount of the monomer comprising the hydrophilic functional group during the polymerization. Said content of the hydrophilic functional group in the polymer can be controlled by the monomer ratio during the polymer production. When the content of the hydrophilic functional group in the polymer is within said range, the adhesive amount of the polymer to the inorganic filler and the polymer amount released to the porous film slurry, which will be described in the following, can be balanced out; hence the dispersing property of the inorganic filler or the binding property between the inorganic fillers are improved.

In the present invention, the content of the polymer having the glass transition temperature of 15° C. or less in the binder of the porous film is preferably 30 to 95 wt %, and further preferably 50 to 80 wt %. By having the content of the polymer having the glass transition temperature of 15° C. or less in said binder within said range, it does not adhere during the roll winding, and the porous film having high flexibility can be obtained.

The content of the bindier in the porous film is 0.1 to 10 parts by weight, further preferably 0.5 to 5 parts by weight, with respect to 100 wt % of the inorganic filler. By having the content of the binder in the porous film within said range, while maintaining the binding property to the inorganic fillers and electrodes and the flexibility, the movement of Li is not interfered thus the resistant does not enlarge.

The porous film may further comprise, other than said inorganic filler and the polymer having the glass transition temperature of 15° C. or less, a dispersing agent or electrolytic additives having the electrolyte solution degradation suppression function or so. As long as these do not affect the battery reaction, it is not particularly limited.

As the dispersing agent, an anion compound, a cation compound, nonionic compound, or high molecular compound may be mentioned as examples. The dispersing agent is selected depending on the inorganic filler used.

Besides the above mentioned, nano particles such as fumed silica or fumed alumina or so; and a surfactant such as alkyl type surfactant, silicon type surfactant, fluoride type surfactant and metal type surfactant or so may be mentioned. By mixing said nano particles, the thixotropy of the porous film forming slurry can be controlled, further the leveling of the porous film obtained thereby can be improved. By mixing said surfactant, the repelling generated during the coating can be prevented and the smoothness of the electrodes can be improved. As the content of the surfactant in the porous film, it is preferably within the range which does not influence the battery characteristics, and 10 wt % or less is preferable.

(The Slurry for a Porous Film)

The slurry for a porous film of the present invention comprises the inorganic filler, the styrene resin, the polymer having the glass transition temperature of 15° C. or less and the solvent.

The solid portion concentration of the slurry for a porous film is not particularly limited as long as it has the viscosity and the fluidity so that the coating and the immersing of the slurry can be done; however generally it is 20 to 50 wt % or so. Also, as the dispersing agent of the slurry, those which can dissolve the styrene resin uniformly are preferable. As the solvent capable to dissolve the styrene resin uniformly, the solvent having close solubility parameter (SP value) with the styrene resin is preferable (the solubility parameter is described in Polymer Handbook, J. Brandrup and E. H. Immergut (Eds)). Generally, as the aromatic hydrocarbons, benzene, toluene, xylene, ethylbenzene or so may be mentioned; and as chlorinated aliphatic hydrocarbons, methylenechloride, chloroform, carbon tetrachloride or so may be mentioned. Other than those, pyridine, acetone, dioxane, dimethyl formamide, methylethyl ketone, diisopropyl ketone, cyclohexanone, tetrahydrofuran, n-butyl phthalate, methyl phthalate, ethyl phthalate, tetrahydrofurfuryl alcohol, ethyl acetate, butyl acetate, 1-nitropropane, carbon disulfide, tributyl phosphate, cyclohexane, xylene, methyl cyclohexane, ethyl cyclohexane, N-methylpyrrolidone or so may be mentioned as the examples. These solvents may be used alone or as the mixed solvents.

Among these, particularly, acetone, cyclohexanone, tetrahydrofuran, cyclohexane, xylene or N-methylpyrrolidone or the mixed solvents thereof are preferable since the dispersing property of the inorganic filler becomes high. Further, cyclohexanone, xylene or N-methylpyrrolidone or the mixed solvents thereof are particularly preferable since the volatility is low and the workability during the slurry coating is superior.

Also, slurry for the porous film may further comprise, besides said inorganic filler and the polymer having the glass transition temperature of 15° C. or less, other components such as the dispersing agent or the electrolytic additives having the electrolyte solution degradation suppression function or so. As long as these do not affect the battery reaction, it is not particularly limited.

The dispersing agent or so which can be comprised other than said inorganic filler and the polymer having the glass transition temperature of 15° C. or less are the same as those described in the porous film description.

(The Production Method of the Slurry for a Porous Film)

The production method of the slurry for a porous film is not particularly limited; and the slurry for a porous film is obtained by mixing said styrene resin, the polymer having the glass transition temperature of 15° C. or less, the inorganic filler, other components which are added depending on the needs and the solvent.

For the present invention, by using the above mentioned component, the slurry for a porous film with highly dispersed inorganic filler can be obtained regardless of the mixing method and the order of the mixing. The mixing machine is not particularly limited as long as the above mentioned components are mixed uniformly, and a ball mill, a sand mill, a pigment disperser, a grinder, an ultrasonic disperser, a homogenizer, a planetary mixer or so may be used. However, a high power disperser such as a bead mill, a roll mill, a fill mix or so are preferably used.

Also, in the present invention, the slurry viscosity of the slurry for a porous film is preferably 50 mPa·S to 10,000 mPa·S. Said viscosity is the value measured using the Brookfield type viscometer under 25° C. and at the rotation speed of 60 rpm. By having within the above mentioned range, the porous film can be formed using various coating method which will be described in the following. If the viscosity of the slurry for a porous film is out of the above mentioned range, then dripping may occur or it may become difficult to coat uniformly.

(The Production Method of the Porous Film)

As for the production method of the porous film according to the present invention, 1) the method of coating the slurry for a porous film comprising the inorganic filler, the styrene resin, the polymer having the glass transition temperature of 15° C. or less and the solvent on to the predetermined substrate, then drying; 2) the method of immersing the substrate into the slurry for a porous film comprising the inorganic filler, the styrene resin, the polymer having the glass transition temperature of 15° C. or less and the solvent, then drying thereof; 3) the method of coating the slurry for a porous film comprising the inorganic filler, the styrene resin, the polymer having the glass transition temperature of 15° C. or less and the solvent onto the releasing film to form the film, then transferring the obtained porous film onto the predetermined substrate; may be mentioned. Among these method, 1) the method of coating the slurry for a porous film comprising the inorganic filler, the styrene resin, the polymer having the glass transition temperature of 15° C. or less and the solvent on to the predetermined substrate, then drying is most preferable since the thickness of the porous film can be easily controlled.

The production method of the porous film of the present invention is characterized by coating the above mentioned slurry for a porous film onto the substrate, and then drying.

In the production method of the porous film according to the present invention, the substrate is not particularly limited; however particularly the porous film of the present invention is preferably formed on the surface of the electrodes of the secondary battery or the electric double layer capacitor, and particularly it is preferably formed on the surface of the electrode composite layer of the electrodes.

The method of coating the slurry for a porous film onto the electrode composite layer is not particularly limited. For example, the methods such as the doctor blade method, the dip method, the reverse roll method, the direct roll method, the gravure method, the extrusion method, the brushing method or so may be mentioned. Among these, the dip method or the gravure methods are preferable since uniform porous film can be obtained.

As for the drying method; drying by warm air, hot air, or lightly wetted air, vacuum drying or the drying method by irradiating the (far) infrared ray or the electron beam may be mentioned. The drying temperature can be changed depending on the types of the solvent being used. In order to completely remove the solvent, for example when using the solvent having low volatility such as N-methylpyrrolidone or so, it is preferable to dry under high temperature of 120° C. or higher by using the dryer of air blower type. On the other hand, when using the solvent having high volatility, then it may be dried under low temperature of 100° C. or less.

Then, depending on the needs, the adhesiveness between the electrode composite layer and the porous film can be improved by applying the pressure using the mold press or roll press or so. Note that, in this case, if the pressure is applied too much, the porosity of the porous film may be impaired therefore the pressure and the pressing time is controlled appropriately.

The thickness of the porous film is not particularly limited; and it is determined depending on the use of the porous film or on the applied field. However, if it is too thin the uniform film cannot be formed, and if it is too thick the capacity per volume (weight) in the battery is reduced, hence it is preferably 1 to 50 μm, and further it is preferably 1 to 20 μm when forming as the protective film on the electrode surface.

The porous film of the present invention is filmed on the surface of the electrode composite layer of the secondary battery electrode, and preferably used as the protective film of the electrode composite layer or as the separator. The secondary battery electrode being filmed with the porous film is not particularly limited, and the porous film of the present invention can be filmed to the electrodes with various constitutions. Also, the porous film may be filmed to the surface of either the positive electrode or the negative electrodes of the secondary battery, and it may be filmed on both. Further, the porous film can be used as the electrode protective film of the electric double layer capacitor.

The porous film of the present invention is formed by binding the inorganic filler via the binder, thereby has the structure formed with the pores between the filler. In these pores, the electrolyte solution can pass through; hence the battery reaction is not interfered.

(The Electrodes)

Such secondary battery electrode and the electrodes of the electric double layer capacitor are generally formed by adhering the electrode composite layer formed by the electrode binder and the slurry comprising the electrode active materials (hereinafter referred as "composite slurry"), to the current collector.

The secondary battery active materials can be anything as long as it can load and release lithium ions reversibly by applying the electrical potentials in the electrolytes; and the inorganic or organic compounds may be used.

The electrode active materials (positive electrode active materials) of the secondary battery can be largely separated to those formed from the inorganic compounds and the organic compounds. As for the positive electrode active materials formed from the inorganic compounds, transition metal oxides, compositeoxides of lithium and transition metals, and transition metal sulfides or so may be mentioned. As for the above mentioned transition metals, Fe, Co, Ni, Mn or so may be used. As for the specific examples of the inorganic materials used for the positive electrode active materials, the lithium containing composite metal oxides such as $LiCoO_2$, $LiNiO_2$, $LiMnO_2$, $LiMn_2O_4$, $LiFePO_4$, $LiFeVO_4$ or so; the transition metal sulfides such as $TiS_2$, $TiS_3$, amorphous $MoS_2$ or so; the transition metal oxides such as $Cu_2V_2O_3$, amorphous $V_2O$—$P_2O_5$, $MoO_3$, $V_2O_5$, $V_6O_{13}$ or so may be mentioned. These compounds may partially be element substituted. As for the positive electrode active materials formed from the organic compounds, conductive macromolecule such as polyacetylene, poly-p-phenylene or so may be used. Iron oxides having the poor electric conductivity may be used as the electrode active materials covered with the carbon materials by providing the carbon source substances during the reduction firing. Also, these compounds may partially be element substituted.

The positive electrode active materials may be mixture of above mentioned inorganic compounds and organic compounds. The particle diameter of the positive electrode active materials are selected depending on the balance between other constitutional elements of the battery; however usually the 50% volume cumulative diameter is 0.1 to 50 μm, preferably 1 to 20 μm, from the point of improving the battery characteristics such as the load characteristics and the cycle characteristics or so. When the 50% volume cumulative diameter is within this range, the secondary battery with the large charge-discharge capacity can be obtained, and also the handling when producing the electrode slurry and the electrodes are easy. The 50% volume cumulative diameter can be obtained by measuring the particle distribution by laser diffraction.

As for the electrode active materials (the negative electrode active materials) of the secondary battery negative electrode, carbon materials such as amorphous carbons, graphite, natural graphite, mesocarbonmicrobeads, pitch type carbon fiber or so, and the conductive macromolecules such as polyacenes or so may be mentioned. Also, as the negative electrode active materials, metals such as silicon, tin, zinc, manganese, iron, nickel or so and the alloys thereof, oxides and sulfates of said metals and the alloys may be used. Additionally, lithium alloys such as metallic lithium, Li—Al, Li—Bi—Cd, Li—Sn—Cd or so, lithium transition metal nitrides, silicon or so may be used. The electrode active material of which the conductivity imparting material is provided on the surface using the mechanical modification method may be used. The particle diameter of the negative electrode active materials are selected depending on the balance between other constitutional elements of the battery; however usually the 50% volume cumulative diameter is 1 to 50 μm, preferably 15 to 30 μm, from the point of improving the battery characteristics such as the initial efficiency, the load characteristics and the cycle characteristics or so.

As the electrode active materials of the electric double layer capacitor, the powder of the fibers of the carbon substances such as, activated carbons, polyacenes, carbon whiskers, graphite or so may be used. Preferably the electrode active materials are activated carbons; as for the activated carbons, a phenol type, a rayon type, an acryl type, a pitch type, a coconut husk type or so may be used. The specific surface area of the activated carbons is generally 500 to 5,000 $m^2/g$, and preferably 1,000 to 3,000 $m^2/g$. Also, the non-porous carbons which comprises the graphite like micro crystallite carbons and the space between those micro crystallite carbons are enlarged, which is described in JP-A-H11-317333, JP-A-2002-25867 or so, may be used as the electrode active materials. The specific surface are of the non-porous carbons is 10 to 1,000 $m^2/g$, preferably 130 to 300 $m^2/g$. The particle diameter of the electrode active materials is preferably 0.1 to 100 μm, more preferably 1 to 20 μm. When it is within said range, it is preferable since the film of the capacitor electrodes can be made thinner easily, and the capacity density can be made higher. Further, in regards with the redox capacitor, the metal oxides such as ruthenium oxides ($RuO_2$) or so may be used as the electrode active materials.

The conductivity imparting materials may be added to the composite slurry, besides adhering to said electrode active materials. As the conductivity imparting material, the conductive carbons such as acetylene black, ketjen black, carbon black, graphite, vapor phase grown carbon fibers, carbon nanotubes or so may be used. Carbon powders such as graphite, and the fibers and foils of various metals may also be mentioned. As the reinforcement material, the fillers of the spherical shape, the board shape or the stick shape of various inorganic and organic materials can be used. By using the conductivity imparting material, the electric contacts between each electrode active material can be improved; and in case of using the lithium ion secondary battery, the discharging rate characteristics can be improved, further the internal resistance when using the electric double layer capacitor is reduced and the capacity density can be made higher. The amount of conductivity imparting material used is usually 0 to 20 parts by weight, and preferably 1 to 10 parts by weight with respect to 100 parts by weight of the electrode active materials.

The electrode composite layer comprises the electrode binder and the electrode active materials. Usually, the composite is prepared as the composite slurry in which the solvent is dispersed.

As the electrode binder, various resin components can be used. For example, polyethylene, polytetrafluoroethylene (PTFE), polyvinylidene fluoride (PVDF), tetrafluoroethylene-hexafluoropropylene copolymer (FEP), polyacrylic acid derivatives, polyacrylonitrile derivative or so may be used. These may be used alone, or it may be mixture of two or more.

Further, the soft polymers which are described in the following as the examples may be used as the electrode binder.

The acrylic type soft polymers which is the homopolymer of the acrylic acid derivative or the methacrylic acid derivative, or the copolymer of the monomer copolymerizable therewith; such as polybutylacrylate, polybutylmethacrylate, polyhydroxyethylmethacrylate, polyacrylamide, polyacrylonitrile, butylacrylate/stylene copolymer, butylacrylate/acrylonitrile copolymer, butylacrylate/acrylonitrile/glycidylmethacrylate copolymer or so; isobutylene type soft polymer such as polyisobutylene, isobutylene/isoprene rubber, isobutylene/styrene copolymer or so;

diene type soft polymer such as polybutadiene, polyisoprene, butadiene/styrene random copolymer, isoprene/styrene random copolymer, acrylonitrile/butadiene copolymer, acrylonitrile/butadiene/styrene copolymer, butadiene/styrene block copolymer, styrene/butadiene/styrene/block copolymer, isoprene/styrene/block copolymer, styrene/isoprene/styrene/block copolymer or so;

silicon containing soft copolymer such as dimethylpolysiloxane, diphenylpolysiloxane, dihydroxypolysiloxane or so;

olefin type soft polymer such as liquid polyethylene, polypropylene, poly-1-butene, ethyelene/α-olefin copolymer, propylene/α-olefin copolymer, ethylene/propylene/diene copolymer (EPDM), ethylene/propylene/styrene copolymer or so;

vinyl type soft polymer such as polyvinyl alcohol, polyvinyl acetate, polyvinyl stearic acid, vinyl acetate/styrene copolymer or so;

epoxy type soft polymer such as polyethylene oxide, polypropylene oxide, epichlorohydrin rubber or so;

fluoride containing soft polymer such as vinyliden fluoride rubber, tetrafluoroethylene-propylene rubber or so;

other soft polymers such as natural rubber, polypeptide, protein, polyester thermoplastic elastomer, vinylchloride thermoplastic elastomer, polyamide thermoplastic elastomer or so may be mentioned. These soft polymers may have crosslinking structure, or it may be introduced with functional groups by modifications.

When using as the lithium secondary battery, the amount of the electrode binder is preferably 0.1 to 5 parts by weight, more preferably 0.2 to 4 parts by weight, and particularly preferably 0.5 to 3 parts by weight, with respect to 100 parts by weight of the electrode active materials. Also, when using as the electric double layer capacitor, it is preferably 0.1 to 20 parts by weight, and more preferably 0.5 to 10 parts by weight, with respect to 100 parts by weight of the electrode active materials. If the amount of the binder is too little, the active materials easily falls off from the electrodes, and on the other hand, if the amount is too much, then the active material may be covered by the binder which causes to interfere the battery reaction, and the internal resistance may become larger.

The electrode binder is prepared as the solvent or the disperser for producing the electrode. The viscosity at that time is usually within the range of 1 mPa·S to 300,000 mPa·S, and preferably 50 mPa·S to 10,000 mPa·S. Said viscosity is the value measured using the Brookfield type viscometer under 25° C. and at the rotation speed of 60 rpm.

The composite slurry usually comprises the solvent and the electrode active material and the conductivity imparting agent are dispersed. As the solvent, it is preferable to use those which can dissolve said binder, since the dispersing property of the electrode active material and the conductivity imparting agent can be improved. By using under the condition that the binder is dissolved in the solvent, it is speculated that the binder is adhered to the surface of the electrode active material or so, thereby it is stably dispersed by the volume effect thereof.

As the solvent used for the composite slurry, both the water and the organic solvent can be used. Among these, it may be those which dissolve said electrode binder or disperses in the form of the particles; however which dissolves the binder is preferable. When using the solvent which dissolves the binder, the binder adheres to the surface thereby the electrode active materials are stably dispersed. As the organic solvent, cycloaliphatic hydrocarbons such as cyclopentane, cyclohexane or so; aromatic hydrocarbons such as toluene, xylene or so; ketones such as ethylmethylketone, cyclohexanone or so; esters such as ethyl acetate, butyl acetate, γ-butyl lactone, ε-caprolactone or so; acylnitriles such as acetonitrile, propionitrile or so; ethers such as tetrahydrofuran, ethylene glycol diethyl ether or so; alcohols such as methanol, ethanol, isopropanol, ethylene glycol, ethylene glycol monomethyl ether or so; amides such as N-methylpyrrolidone, N,N-dimethylformaide or so may be mentioned. These solvents may be used alone or by mixing two or more thereof, by appropriately selecting according to the drying speed and the environment or so. Among these, in the present invention, from the point of the electrode expansion characteristics against the water, a non-aqueous solvent is preferably used.

In the composite slurry, the additives which exhibits various function can be added such as the viscosity thickener, the conductive material, the reinforcement material or so. As the viscosity thickener, the polymer soluble in the organic solvents used in the composite slurry is used. Specifically, hydrides of acrylonitrile-butadiene copolymer or so may be used.

Further, in the composite slurry, in order to improve the battery stability and the lifetime, trifluoropropylene carbonate, vinylene carbonate, catechol carbonate, 1,6-dioxaspiro[4,4]nonane-2,7-dione, 12-crown-4-ether or so may be used. Also, these can be comprised in the electrolyte solution described in the following.

The amount of the organic solvent in the composite slurry depends on the types of the electrode active materials and the binders, and it is used by controlling so that the viscosity is suitable for coating. Specifically, the concentration of the solid portion including the electrode active materials, the binder, and other additives is controlled so that it is preferably 30 to 90 wt %, and more preferably 40 to 80 wt % and used.

The composite slurry is obtained by mixing the electrode binder, the electrode active materials, the additives which is added if needed, and other organic solvent using the mixer. The mixing may be carried out by providing each component above mentioned in to the mixer at once; however, it is preferable to mix by first mixing the conductive material and the viscosity thickener in the organic solvent to disperse the conductive material into fine particles, then add the binder and the electrode active materials and further mix, thereby the dispersing property of the slurry can be improved. As the mixer, a ball mill, a sand mill, a pigment disperser, a grinder, an ultrasonic disperser, a homogenizer, a planetary mixer, a Hobart mixer or so may be used; however the ball mill is preferably used since the coagulation of the conductive material and the electrode active material can be suppressed.

The granularity of the composite slurry is preferably 35 μm or less, and further preferably 25 μm or less. When the granularity of the slurry is within the above range, then the dispersing property of the conductive material is high hence the uniform electrode can be obtained.

The current collector is not particularly limited as long as the material has the electric conductivity and the electrochemical durability; however from the point of the heat resistance property, for example metal materials such as iron, copper, aluminum, nickel, stainless steel, titanium, tantalum, gold, platinum or so is preferable. Among these, as for the positive electrode of the non-aqueous electrolytic secondary battery, aluminum is particularly preferable, and as for the negative electrode, copper is particularly preferable. The shape of the current collector is not particularly limited; however, the sheet form having the thickness of 0.001 to 0.5 mm or so is preferable. The current collector is preferably carried out with the roughening treatment in advance in order to increase the adhering strength of the composite. As the method for the roughening, the mechanical polishing method, the electro polishing method, the chemical polishing or so may be mentioned. As for the mechanical polishing method, the coated abrasives which is adhered with the abrasive particles, the grind stone, the emery wheel; the wire brushes equipped with the steel wire, or so may be used. Also, an intermediate layer may be formed on the surface of the current collector in order to increase the adhering strength and the conductivity of the electrode composite layer.

The production method of the secondary battery electrode may be which binds the electrode composite layer in the layer-form on at least the one side of said current collector, and preferably on the both sides thereof. For example, said composite slurry is coated on the current collector, and then dried, followed by heat treating at 120° C. or higher for 1 hour or more, thereby form the composite electrode layer. The method of coating the composite slurry on the current collector is not particularly limited. For example, the doctor blade method, the dip method, the reverse roll method, the direct roll method, the gravure method, the extrusion method, the brushing method or so may be mentioned. As for the drying method; drying by warm air, hot air, or lightly wetted air, vacuum drying or the drying method by irradiating the (far) infrared ray or the electron beam may be mentioned.

Next, by using the mold press and roll press or so, the porosity of the electrode composite is preferably reduced by the pressure applying treatment. The preferable range of the porosity is 5% to 15%, and more preferably 7% to 13%. If the porosity is too high, the charging efficiency and the discharging efficiency is deteriorated. If the porosity is too low, it may be difficult to obtain high volume capacity, and the failure tends to easily happen since the composites are released easily. Further, when using the curable polymer, it is preferably cured.

The thickness of the electrode composite is, for both of the negative electrode and the positive electrode, usually 5 to 300 μm, and preferably 10 to 250 μm or so.

The secondary battery provided with the present porous film is used as the electrode of the lithium ion secondary battery or the electric double layer capacitor or so. Among these, it is preferably used as the electrode of the lithium ion secondary battery.

The lithium ion secondary battery of the present invention comprises the positive electrode, the negative electrode, and the electrolyte solution; and at least one of the positive electrode or the negative electrode is said secondary battery electrode (hereinafter, it may be referred as "the secondary battery electrode with the porous film").

The example using the positive electrode and the negative electrode to said secondary battery electrode with the porous film will be described in the following. As for the specific production method of the lithium ion secondary battery, for example, the positive electrode with the porous film and the negative electrode with the porous film are stacked via the separator; and this is introduced into the battery by rolling up or by bending into the battery shape, then introducing the electrolyte solution into the battery container followed by closing. Also if needed, the overcurrent protection element such as the expand metal, the fuse, the PTC element, the lead board or so can be introduced in order to prevent the pressure rising inside the battery and the excessive charging-discharging. The shape of the battery may be any of the coin shape, the button shape, cylindrical shape, the square shape, the flattened shape or so.

As the electrolyte solution, the organic electrolyte solution is used, in which the supporting electrolyte is dissolved in the organic solvent. As the supporting electrolyte, lithium salt is used. The lithium salts is not particularly limited, however $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ or so may be mentioned. Among these, $LiPF_6$, $LiClO_4$, $CF_3SO_3Li$ are preferable which easily dissolves in the solvent and has high degree of dissociation. Two or more of these may be used together. The more the supporting electrolyte with high degree of dissociation is used, the higher the lithium ion conductivity becomes; hence the lithium ion conductivity can be controlled depending on the type of the supporting electrolytes.

As the organic solvent used for the electrolyte solution, it is not particularly limited as long as it can dissolve the supporting electrolytes; however carbonates such as dimethyl carbonate (DMC), ethylene carbonate (EC), diethyl carbonate (DEC), propylene carbonate (PC), butylenes carbonate (BC), methylethyl carbonate (MEC) or so; esters such as γ-butyrolactone, methyl formate or so; ethers such as 1,2-dimethoxyethane, tetrahydrofuran or so; sulfur containing compounds such as sulfolane, dimethylsulfoxide or so may be preferably used. Also, the mixture of those solvents may be used. Among these, the carbonates are preferable since it has high dielectric constant and wide range of stable electric potential area. The less the viscosity of the used solvent is, the higher the lithium ion conductivity becomes, hence the lithium ion conductivity can be controlled depending on the type of the solvent.

The concentration of the supporting electrolyte in the electrolyte solution is usually 1 to 30 wt %, and preferably 5 to 20 wt %. Also, depending on the type of the supporting electrolytes, it is usually used in the concentration between 0.5 to 2.5 mol/l. The ion conductivity tends to lower when the concentration of the supporting electrolytes is too low and too high. The lower the concentration of the used electrolyte solution is, the larger the swelling degree of the polymer particles becomes, and hence the lithium ion conductivity can be controlled by the concentration of the electrolyte solution.

The lithium ion secondary battery of the present invention may further comprise the separator. As said separator, known separator made of non-woven fabric or the fine porous film comprising polyolefin resin such as polyethylene, polypropylene or so or aromatic polyamide resins may be used. Note that the porous film of the present invention also has the function as the separator hence the use of the separator may be omitted.

EXAMPLES

In the following, the present invention will be described based on the examples, however the present invention is not limited thereto. Note that, "parts" and "%" in the present examples is in weight base unless mentioned otherwise.

Various physical properties in the examples and the comparative examples were evaluated as described in the following.
(The Evaluation Method)
<1. The Characteristic of the Electrodes with the Porous Film: the Powder Falling Property>

The electrode with the porous film was cutout in a 5 cm square, and placed in the 500 ml glass bottle, then shaken for 2 hours at 200 rpm using the shaker machine.

When setting, the weight of the fallen powder as "a", the weight of the electrode before shaking as "b", the weight of the electrode before coating the porous film as "c", and the weight of the fallen powder when only the electrode which is not coated with the porous film was shaken as "d", the ratio X of the fallen powder is calculated as described in the following, and evaluated by the below standard. The smaller value of the ratio X of the fallen powder, it indicates that the powder falling was further effectively suppressed.

$$X=(a-d)/(b-c-a)\times 100 \text{ (wt \%)}$$

(The Evaluation Standard)
A: less than 1%
B: 1% or more, and less than 2%
C: 2% or more, and less than 5%
D: 5% or more, and less than 10%
E: 10% or more, and less than 20%
F: 20% or more <2. The Characteristics of the Electrode with the Porous Film: the Flexibility>

The electrode was cut in to a rectangular shape having a width of 1 cm×a length of 5 cm and the test piece was made. The face of the current collector side of the test piece was faced down and placed on the table, and then the stainless rod with 1 mm diameter was laid in a short direction at the center (the position at 4.5 cm from the end portion). The test piece was 180° bent over taking said stainless rod at the center so that the porous film is on the outer side. This procedure was carried out to 10 test pieces, the presence of the crack or the peeling were observed at the bend portions of the porous film of each test piece; then evaluated as described in below. The lesser the crack and the peeling are, it indicates the flexibility of the electrode is superior.
A: Neither the crack nor the peeling were found in all 10 pieces.
B: The cracks or the peelings were found in 1 to 3 pieces out of 10 pieces.
C: The cracks or the peelings were found in 4 to 9 pieces out of 10 pieces.
D: The cracks or the peelings were found in all of 10 pieces.

<3. The Characteristics of the Electrode with the Porous Film: the Smoothness>

The electrode was cut into 3 cm×3 cm to form the test piece. The test piece was set to the laser microscope by facing down the surface of the current collector side. Then, in the area of 100 μm×100 μm and by using 50 times magnitude of the lens, the surface roughness Ra value was measured for arbitrary 5 parts of the porous film surface, in accordance with the JIS B0601:2001 (ISO4287:1997). This was carried out for 10 test pieces, and the average value of the all measured values was determined as the smoothness by using the following standard. The smaller the Ra value is, the better the smoothness is.
A: Ra value of less than 0.5 μm
B: Ra value of 0.5 μm or more and less than 0.8 μm
C: Ra value of 0.8 μm or more and less than 1.0 μm
D: Ra value of 1.0 μm or more and less than 1.5 μm
E: Ra value of 1.5 μm or more Example 1

The Production of the Polymer 300 parts of the ion change water, 81.5 parts of n-butylacrylate, 15 parts of acrylonitrile, 3.0 parts of glycidyl methacrylate, 0.5 parts of 2-acrylamide2-methylpropane sulfonic acid, 0.05 parts of t-dodecylmercaptan as the molecular weight modifier, and 0.3 parts of potassium persulfate as the polymerization initiator were placed in the autoclave which is provided with the mixer; then stirred well, followed by polymerizing by heating at 70° C., thereby obtained butylacrylate/acrylonitrile copolymer (herein after referred as "polymer A") particle aqueous dispersion. The polymerization conversion rate obtained from the solid portion concentration was almost 99%. 320 parts of N-methylpyrrolidone (hereinafter referred as "NMP") was added to 100 parts of this polymer particle aqueous dispersion, then the water was evaporated under the reduced pressure, and NMP solution of the polymer A was obtained. The glass transition temperature of the polymer A was −5° C., and the ratio of the monomer comprising the hydrophilic functional group was 0.5%.

<The Production of the Slurry for a Porous Film>

The inorganic filler (alumina having the average particle diameter of 0.3 μm), polystyrene (manufacutured by Aldrich Co., the weight average molecular weight of 192,000, the glass transition temperature of 82° C.), and the polymer A as other polymer were mixed so that it satisfies the content ratio (the solid portion equivalent ratio) described in Table 1, and further N-methylpyrrolidone was added so that the solid portion concentration becomes 50%; then by dispersing using the beads mill, the slurry for a porous film 1 was prepared.

<The Negative Electrode Composition and the Production of the Negative Electrode>

98 parts of graphite having the particle diameter 20 μm and the specific surface area of 4.2 m²/g as the negative electrode active material, and 5 parts in terms of the solid portion of polyvinylidene fluoride (PVDF) were mixed, and further NMP was added then mixed by the planetary mixer thereby prepared the negative electrode composition in the slurry form (the composite slurry). This negative electrode composition was coated on the one side of the copper foil having the thickness of 0.1 mm, and dried for 3 hours at 110° C., then roll pressed; thereby obtained the negative electrode having the thickness of 100 μm comprising the negative electrode composite layer.

<The Production of the Electrode with the Porous Film>

Said the slurry for a porous film 1 was coated in the thickness of 3 μm on to the negative electrode composite layer surface of the negative electrode so that the negative electrode composite layer was completely covered. Then by drying for 20 minutes at 110° C., the porous film was made, thereby the electrode with the porous film (the secondary battery electrode) was made.

The powder falling property, the smoothness, the flexibility of the obtained electrode with the porous film were evaluated. The results are shown in Table 1.

Example 2

47 parts of styrene, 49 parts of 1,3-butadiene, 3 parts of methacrylic acid, 1 part of acrylic acid, 5 parts of sodium dodecylbenzenesulfonate, 150 parts of ion change water, 1 part of potassium persulfate as the polymerization initiator were placed in the 5 MPa pressure resistant autoclave with the mixer machine, after mixed sufficiently, the polymerization was initiated by heating at 45° C. When the used amount of the monomer became 96.0%, the reaction was terminated by cooling, thereby obtained the dispersion of the polymer B having the solid portion concentration of 42%. 320 parts of NMP was added to this dispersion, then the water was evaporated under the reduced pressure, thereby the NMP solution of the polymer B was obtained. The glass transition temperature of the polymer B was −10° C., and the ratio of the monomer unit comprising the hydrophilic functional group was 4%.

Instead of using the polymer A as other polymer of the example 1, the polymer B was used, and other than changing the content ratio of the inorganic filler (alumina), polystyrene and other polymer (polymer B) as shown in Table 1, the slurry for a porous film and the electrode with the porous film were produced as same as the example 1. Then, the powder falling property, the smoothness and the flexibility of the produced electrode with the porous film were evaluated. The results are shown in Table 1.

Example 3

Instead of using the polymer A as other polymer of the example 1, polyvinylidene fluoride (hereinafter it may be referred as "PVDF", the glass transition temperature is −35° C.) was used, and other than changing the content ratio of the inorganic filler (alumina), polystyrene and other polymer (PVDF) as shown in Table 1, the slurry for a porous film and the electrode with the porous film were produced as same as the example 1. Then, the powder falling property, the smoothness and the flexibility of the produced electrode with the porous film were evaluated. The results are shown in Table 1.

Example 4

The Positive Electrode Composition and the Production of the Positive Electrode 95 parts of $LiCoO_2$ having the spinel structure as the positive electrode active material, 3 parts in solid portion equivalent of PVDF (polyvinylidene fluoride) as the binder, further 2 parts of acetylene black and 20 parts of N-methylpyrrolidone were added and mixed using the planetary mixer; thereby the positive electrode composition in the slurry form (the composite slurry) was obtained. This electrode composition was coated on the aluminum foil having the thickness of 18 μm, and dried for 3 hours under 120° C., and roll pressed; thereby obtained the positive electrode having the thickness of 100 μm comprising the positive electrode composite layer.

The content ratio of the inorganic filler (alumina), polystyrene, other polymer (the polymer A) in the example 1 was changed as described in Table 1, and besides coating the porous film slurry on the positive electrode composite layer of the positive electrode, the slurry for a porous film and the electrode with the porous film were made as same as the example 1. Then, the powder falling property, the smoothness and the flexibility of the produced electrode with the porous film were evaluated. The results are shown in Table 1.

Example 5, 6

In stead of polystyrene having the molecular weight of 192,000 used in the example 1, the example 5 used polystyrene having the molecular weight of 5,000 and the glass transition temperature of 82° C., and the example 6 used polystyrene having the molecular weight of 450,000 and the glass transition temperature of 82° C. Other than that, the slurry for a porous film and the electrode with the porous film were made as same as the example 1. Then, the powder falling property, the smoothness and the flexibility of the produced electrode with the porous film were evaluated. The results are shown in Table 1.

Comparative Example 1

The polystyrene was not used and the content ratio of the inorganic filler (alumina) and other polymer (the polymer A) in the example 1 were changed as described in Table 1. Other than that, the slurry for a porous film and the electrode with the porous film were made as same as the example 1. Then, the powder falling property, the smoothness and the flexibility of the produced electrode with the porous film were evaluated. The results are shown in Table 1.

Comparative Example 2

Other polymer was not used, and the content ratio (the solid portion equivalent ratio) of the inorganic filler (alumina), and the polystyrene in the example 1 were changed as described in Table 1. Other than that, the slurry for a porous film and the electrode with the porous film were made as same as the example 1. Then, the powder falling property, the smoothness and the flexibility of the produced electrode with the porous film were evaluated. The results are shown in Table 1.

Comparative Example 3

Besides changing the content in the example 2 to, 77 parts of styrene, and 19 parts of 1,3-butadiene, the polymerization was carried out as same as the example 2; thereby the dispersion having the solid concentration of 40% was obtained. 320 parts of NMP was added to 100 parts of this dispersion, and the water was evaporated under the reduced pressure, and the NMP solution of the polymer C was obtained. The glass transition temperature of the polymer C was 40° C., and the ratio of the monomer unit comprising the hydrophilic functional group was 4%.

Then, instead of the polymer A as other polymer in the example 1, the polymer C was used, and the content ratio (the solid portion equivalent ratio) of the inorganic filler (alumina), polystyrene, other polymer (the polymer C) were changed as described in Table 1. Other than that, the slurry for a porous film and the electrode with the porous film were made as same as the example 1. Then, the powder falling property, the smoothness and the flexibility of the produced electrode with the porous film were evaluated. The results are shown in Table 1.

Comparative Example 4

Besides changing the content in the example 2 to, 87 parts of styrene, and 9 parts of 1,3-butadiene, the polymerization was carried out as same as the example 2; thereby NMP solution of the polymer D having solid concentration of 40% was obtained. The glass transition temperature of the polymer D was 60° C., and the ratio of the monomer unit comprising the hydrophilic functional group was 4%.

Then, instead of the polymer A as other polymer in the example 1, the polymer D was used, and the content ratio (the solid portion equivalent ratio) of the inorganic filler (alumina), polystyrene, other polymer (the polymer D) were changed as described in Table 1. Other than that, the slurry for a porous film and the electrode with the porous film were made as same as the example 1. Then, the powder falling property, the smoothness and the flexibility of the produced electrode with the porous film were evaluated. The results are shown in Table 1.

TABLE 1

| | Content ratio in Porous film (wt %) | | | Polystyrene | Other polymer | | Powder falling property | Flexibility | Smoothness |
|---|---|---|---|---|---|---|---|---|---|
| | Inorganic filler | Polystyrene | Other polymer | Weight average molecular weight | Polymer type | Glass transition temp. (° C.) | | | |
| Example 1 | 97 | 0.1 | 2.9 | 192,000 | Polymer A | −5 | C | A | B |
| Example 2 | 97 | 0.3 | 2.7 | 192,000 | Polymer B | −10 | A | A | A |

TABLE 1-continued

Table 1

| | Content ratio in Porous film (wt %) | | | Polystyrene | Other polymer | | | | |
| --- | --- | --- | --- | --- | --- | --- | --- | --- | --- |
| | Inorganic filler | Polystyrene | Other polymer | Weight average molecular weight | Polymer type | Glass transition temp. (° C.) | Powder falling property | Flexibility | Smoothness |
| Example 3 | 97 | 1.2 | 1.8 | 192,000 | PVDF | −35 | A | C | A |
| Example 4 | 97 | 1.8 | 1.2 | 192,000 | Polymer A | −5 | A | C | A |
| Example 5 | 97 | 0.3 | 2.7 | 5,000 | Polymer A | −5 | C | A | C |
| Example 6 | 97 | 0.3 | 2.7 | 450,000 | Polymer A | −5 | B | B | C |
| Comparative example 1 | 97 | — | 3.0 | — | Polymer A | −5 | E | A | D |
| Comparative example 2 | 97 | 3.0 | — | 192,000 | — | — | B | E | D |
| Comparative example 3 | 97 | 1.2 | 1.8 | 192,000 | Polymer C | 40 | B | E | C |
| Comparative example 4 | 97 | 1.2 | 1.8 | 192,000 | Polymer D | 60 | B | E | C |

According to the results of Table 1, by comprising the polystyrene as the binder and the polymer having the glass transition temperature of 15° C. or less, in the porous film, the binding property at the porous film surface is improved and the powder fall off is suppressed while maintaining the flexibility of the porous film. Among the examples, the example 2 of which having the styrene resin content in the binder is within the range of 5 to 50 wt %, and the styrene resin having the weight average molecular weight within the range of 10,000 to 400,000 shows particularly good in all of the powder falling property, the flexibility and the smoothness.

On the other hand, those which does not comprise the styrene resin as the binder (the comparative example 1), which does not comprise the polymer having the glass transition temperature of 15° C. or less as the binder (the comparative example 2), and which comprises the polymer other than the styrene resin as the binder but uses the polymer having the glass transition temperature of higher than 15° C. (the comparative example 3,4) shows that at least one of the powder falling property, the flexibility and the smoothness being significantly bad; hence cannot suppress the powder falling during the roll winding.

The invention claimed is:

1. A porous film comprising an inorganic filler, and a binder; wherein the porous film comprises a styrene resin having a glass transition temperature of 40° C. or higher, a polymer having a glass transition temperature of 15° C. or less as said binder, and a content of the styrene resin in said binder is 5 wt % or more and 70 wt % or less.

2. The porous film as set forth in claim 1, wherein a content ratio of the binder in said porous film is 0.1 to 5 parts by weight with respect to 100 parts by weight of said inorganic filler.

3. A slurry for preparing the porous film as set forth in claim 1, wherein said slurry comprises the inorganic filler, the styrene resin having a glass transition temperature of 40° C. or higher, the polymer having a glass transition temperature of 15° C. or less and a solvent, and wherein the content of the styrene resin in said binder is 5 wt % or more and 70 wt % or less.

4. A method for producing the porous film comprising: coating the slurry for a porous film as set forth in claim 3 on a substrate, and then drying the same.

5. An electrode for a secondary battery wherein an electrode composite layer comprising a binder for an electrode and an electrode active material is adhered to a current collector, and the porous film as set forth in claim 1 is provided on the surface of said electrode composite layer.

6. A lithium ion secondary battery comprising a positive electrode, a negative electrode and an electrolyte solution wherein at least one of the positive electrode or the negative electrode is the secondary battery electrode as set forth in claim 5.

7. The porous film as set forth in claim 1, wherein a weight average molecular weight obtained by a gel permeation chromatography of the styrene resin having the glass transition temperature of 40° C. or higher is within a range of 10,000 to 600,000.

8. The porous film as set forth in claim 1, wherein a content of a hydrophilic functional group in the polymer having a glass transition temperature of 15° C. or less is within a range of 0.3 wt % to 40 wt % with respect to 100 wt % of an entire content of a monomer as an amount of a monomer comprising the hydrophilic functional group during a polymerization.

9. The porous film as set forth in claim 1, wherein a content of the polymer having a glass transition temperature of 15° C. or less is 30 to 95 wt %.

10. The porous film as set forth in claim 1, wherein said porous film is roll wound.

* * * * *